United States Patent [19]
Faber et al.

[11] Patent Number: 4,721,358
[45] Date of Patent: Jan. 26, 1988

[54] OPTICAL AND ELECTRICAL CONNECTOR DEVICE

[75] Inventors: Johannes W. Faber; Jacques P. Klomp, both of Eindhoven, Netherlands

[73] Assignee: U.S. Philips Corporation, New York, N.Y.

[21] Appl. No.: 798,098

[22] Filed: Nov. 14, 1985

[30] Foreign Application Priority Data

Dec. 5, 1984 [NL] Netherlands ............... 8403691

[51] Int. Cl.⁴ ............................................. G02B 6/38
[52] U.S. Cl. ............................. 350/96.21; 350/96.20; 439/350; 439/620; 439/786; 439/817
[58] Field of Search .............. 350/96.20, 96.21, 96.22; 339/46, 75 R, 91 R, 147 R, 249 R, 252 S, 253 S, 254 R, 254 M, 256 S, 258 R, 273 S

[56] References Cited

U.S. PATENT DOCUMENTS

| | | | |
|---|---|---|---|
| 3,748,633 | 7/1973 | Lundergan | 339/258 R X |
| 4,217,030 | 8/1980 | Howarth | 350/96.21 |
| 4,449,784 | 5/1984 | Basov et al. | 350/96.21 |
| 4,597,631 | 7/1986 | Flores | 350/96.20 |
| 4,616,900 | 10/1986 | Cairns | 350/96.20 |
| 4,678,264 | 7/1987 | Bowen et al. | 350/96.20 |

FOREIGN PATENT DOCUMENTS 2939231  4/1981  Fed. Rep. of Germany ... 350/96.20

Primary Examiner—John Lee
Attorney, Agent, or Firm—Marc D. Schechter

[57] ABSTRACT

The device includes a first connector housing (7) in which end portions of a number of optical fibres (1) are secured and a second connector housing (11) in which a corresponding number of optical elements to be connected to the fibres, for example end portions of further optical fibres (3), is secured. After the connection has been established, the two connector housings (7, 11) are detachably coupled by means of a locking device which includes a first locking portion (17) which is provided at the first end (16) of a lever (15) provided on the first connector housing (7) and a second locking portion (18) which cooperates with the first locking portion and which is provided on the second connector housing (11). In order to establish also an electrical connection between pairs of conductors (35, 41), an electrical contact member (27, 37) is provided near each of the two locking portions (17, 19). In the locked condition, these contact members (27, 37) are electrically interconnected; they are separated from one another upon unlocking.

6 Claims, 4 Drawing Figures

U.S. Patent
Jan. 26, 1988
4,721,358
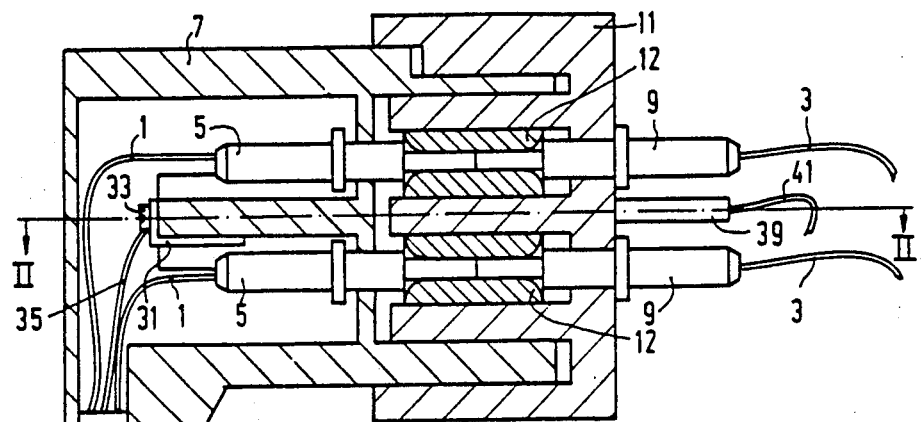
FIG.1
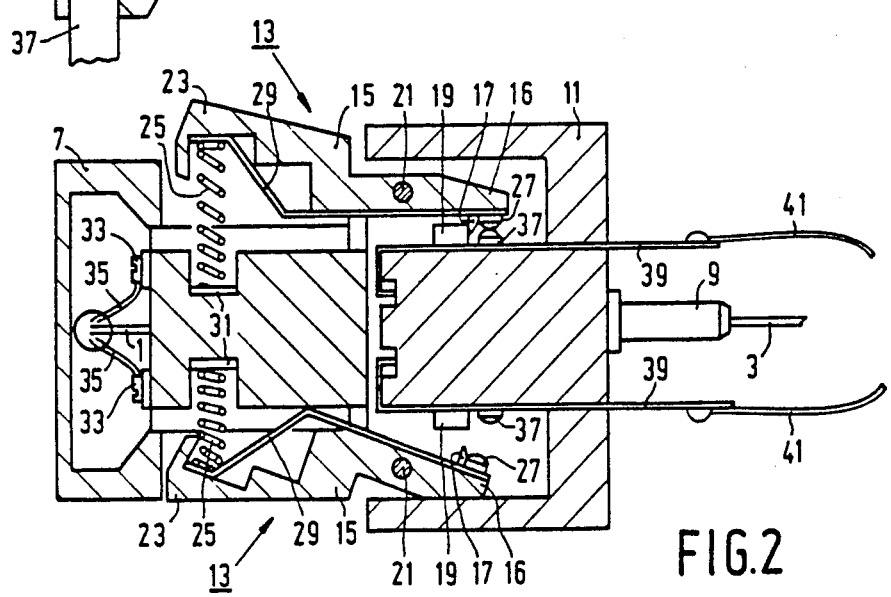
FIG.2
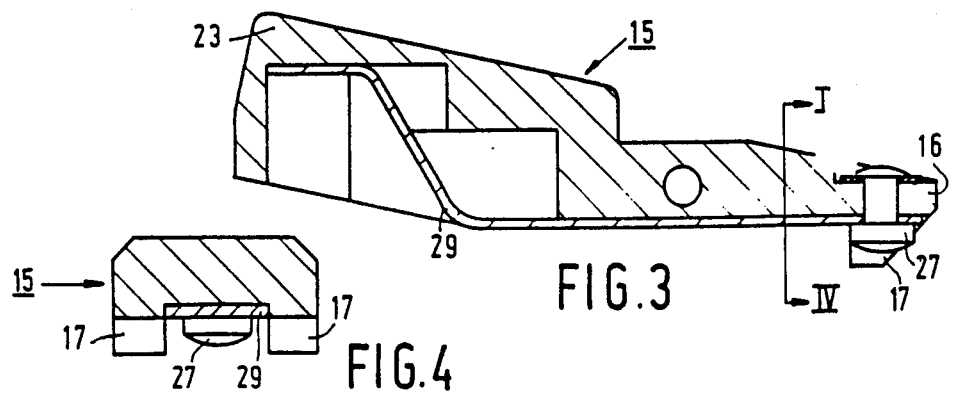
FIG.3
FIG.4

OPTICAL AND ELECTRICAL CONNECTOR DEVICE

BACKGROUND OF THE INVENTION

The invention relates to a device for optical connection of a number of optical fibres to a corresponding number of optical elements. The device includes a first connector housing in which end portions of the optical fibres are secured and a second connector housing in which the optical elements are secured. The two connector housings, after the connection has been established, are detachably coupled by means of at least one locking device comprising a first locking portion which is situated at a first end of a lever provided on the first connector housing and a second locking portion which cooperates with the first locking portion and which is provided on the second connector housing.

A device of this kind is known from German Patent Specification No. 2,939,231. This device offers the advantage that a reliable optical connection can be established and removed again between the optical fibres and the optical elements in a quick and simple manner.

SUMMARY OF THE INVENTION

It is an object of the invention to improve a device of the kind set forth so that, while maintaining said advantage, also one or more electrical connections can be established between electrical conductors, said electrical connections being interrupted before the optical connection during uncoupling.

To achieve this, the device in accordance with the invention is characterized in that near each of the two locking portions there is provided an electrical contact member, the said contact members being electrically interconnected in the locked condition and being separated from one another upon unlocking.

A preferred embodiment of the device in accordance with the invention in which the electrical connection can be established only after completion of the optical connection during coupling of the two connector housings, is characterized in that at least one of the two locking portions is made of an electrically insulating material. The locking portions are formed by at least one hook-shaped projection near the first end of the lever and at least one protrusion on the second connector housing, respectively. The projection passes the protrusion when the connection is established. The height of the protrusion is such that the electrical contact members are separated from one another during this passage.

As in the known device, the optical elements may be, for example, optical transmitter or receiver devices. However, they may alternatively be end portions of further optical fibres.

In a further preferred embodiment of the device in accordance with the invention, the first connector housing is constructed as an optical plug and the second connector housing is constructed as an optical socket.

BRIEF DESCRIPTION OF THE DRAWING

The invention will be described in detail hereinafter with reference to the drawing. Therein:

FIG. 1 is a longitudinal sectional view of an embodiment of a device in accordance with the invention, FIG. 2 is a longitudinal sectional view taken along the line II—II in FIG. 1, FIG. 3 is a longitudinal sectional view at an increased scale of a detail of the device shown in the FIGS. 1 and 2, and FIG. 4 is a cross-sectional view taken along the line IV—IV in FIG. 3.

DESCRIPTION OF THE PREFERRED EMBODIMENTS

The FIGS. 1 and 2 show a device for the optical connection of two optical fibres 1 to two optical elements which are formed by end portions of further optical fibres 3 in the present embodiment. The end portions of the former optical fibres 1 are secured in known manner in ferrules 5 which are secured in known, preferably resilient, manner (not shown) in a first connector housing 7 which is made of plastic. The end portions of the further optical fibres 3 are similarly secured, using ferrules 9, in a second connector housing 11 of plastics.

The first connector housing 7 is constructed as an optical plug in the present embodiment. The second connector housing 11 is constructed as an optical socket which can be secured, using fixing means (not shown), in a wall or in a housing of an apparatus. It will be apparent that it is alternatively possible to construct the first connector housing as a socket and the second connector housing as a plug, or one of the two connector housings as a plug and the other as a coupling socket.

The FIGS. 1 and 2 show the two connector housings 7 and 11 in an interconnected state. The optical fibres 1 are then optically connected to the associated further optical fibres 3 in that the ends of the fibres 1 and 3 contact one another in an alignment sleeve 12.

The two connector housings 7 and 11 are retained by two locking devices 13 (see FIG. 2) in the connected state. Each of these locking devices includes a lever 15 which is preferably made of an electrically insulating material, for example plastic, and which is secured to the first connector housing 7. The first end 16 (at the right in FIG. 2) of said lever is provided with a first locking portion 17. The lever 15 will be described in detail hereinafter with reference to the FIGS. 3 and 4. Each locking device furthermore comprises a second locking portion which is provided on the second connector housing and which is formed by a pair of protrusions 19 which are preferably also made of an electrically insulating material.

The lever 15 (see also the FIGS. 3 and 4) is secured in the first connector housing 7 so as to be pivotable about an axis 21. A spring 25 which is secured in the first connector housing 7 engages near the second end 23 of the lever 15, thus exerting an outwardly-directed force on the second end so that the first end 16 is pressed inward by the spring.

The first locking portion 17 consists of two hook-shaped projections which are disposed near the first end 16. Each projection has an inclined front face which slides across a protrusion 19 on the second connector housing when the connection is established, so that the first end 16 is pressed outward against the force of the spring 25. After the projection 17 has completely passed the protrusion 19, the first end 16 is pressed inward by the spring 25, so that the straight rear face of the projection prevents, in cooperation with the protrusion 19, the withdrawal of the first connector housing. This locked state can be cancelled by pressing the second end 23 with a finger, so that this end is moved inward, after which the first connector housing 7 can be withdrawn.

Adjacent the two projections 17 there are provided electrical contact members 27. Each member 27 is connected to a first strip-shaped conductor 29 which electrically connects the contact member to the end of the spring 25 which engages near the first end 23 of the lever 15. Via this spring and a second strip-shaped conductor 31, the first strip-shaped conductor 29 is electrically connected to a connection screw 33 whereto there is connected a flexible conductor 35 which forms part of a cable 37, together with the optical fibres 1.

Adjacent the protrusions 19, constituting the second locking portion, an electrical contact members 37 are also provided on the second connector housing 11. Each member is connected to a third strip-shaped conductor 39 having an end which projects from the second connector housing and which is connected, for example by means of a soldered connection, to a flexible conductor 41.

In the locked state, each of the contact members 27 is electrically connected to the associated contact member 37. When the first connector housing 7 is inserted into the second connector housing 11, the projections 17 slide across the protrusions 19 in the described manner, so that the contact members 27 and 37 remain separated from one another until the projections have completely passed the protrusions. When the connection is interrupted, these contact members are also separated from one another because the two ends 23 of the levers 15 must be pressed inward before the first connector housing 7 can be withdrawn. It is thus ensured that an electrical connection can exist between the conductors 35 and 41 only when the first connector housing 7 is fully inserted in the second connector housing 11 so that an optical connection exists between the optical fibres 1 and 3.

What is claimed is:

1. A device for optical connection of a number of optical fibres to a corresponding number of optical elements, including a first connector housing in which end portions of the optical fibres are secured and a second connector housing in which the optical elements are secured, which two connector housings, after the connection has been established, are detachably coupled by means of at least one locking device comprising a first locking portion which is situated at a first end of a lever provided on the first connector housing and a second locking portion which cooperates with the first locking portion and which is provided on the second connector housing, characterized in that near each of the two locking portions there is provided an electrical contact member, the said contact members being electrically interconnected in the locked condition and being separated from one another upon unlocking.

2. A device a claimed in claim 1, characterized in that at least one of the two locking portions is made of an electrically insulating material, the locking portions being formed by at least one hook-shaped projection near the first end of the lever and at least one protrusion on the second connector housing, respectively, said projection having to pass the protrusion when the connection is established, the height of the protrusion being such that the electrical contact members are separated from one another during this passage.

3. A device as claimed in claim 1 or 2, characterized in that the optical elements are end portions of further optical fibres.

4. A device as claimed in claim 3, characterized in that the first connector housing is constructed as an optical plug and the second connector housing is constructed as an optical socket.

5. An optical connector comprising:
    a first connector housing for accommodating an end of an optical fiber;
    a second connector housing for accommodating an optical element to be optically coupled to the fiber in the first connector housing;
    a lever pivotally arranged on the first connector housing, said lever having a first end with a projection;
    a protrusion on the second connector housing arranged to be engaged by the projection on the lever when the first and second housings are connected;
    a first electrical contact arranged on the first end of the lever; and
    a second electrical contact on the second connector housing arranged to be contacted by the first electrical contact when the first and second housings are connected and when the projection on the lever engages the protrusion on the second connector housing.

6. An optical connector as claimed in claim 5, characterized in that:
    the first connector housing has an outer surface;
    the lever is pivotable about an axis substantially parallel to a tangent to the outer surface of the first connector housing; and
    the projection on the lever is arranged to slide over the protrusion on the second connector housing in order to connect the first and second housings.

* * * * *